3,709,909
Patented Jan. 9, 1973

3,709,909
DERIVATIVES OF 2,3-DIHYDRO-BENZOTHIO-
PHENE AND BENZOFURAN-2-CARBOXYLIC
ACIDS
Ernst Habicht, Oberwil, Basel-Land, Switzerland, Bernard
Libis, Saint-Louis, France, and Janos Zergenyi, Riehen,
Basel, Switzerland, assignors to Ciba-Geigy Corporation
No Drawing. Filed Sept. 10, 1970, Ser. No. 72,873
Int. Cl. A61k 27/00; C07d 63/22, 5/34
U.S. Cl. 260—330.5                                3 Claims

ABSTRACT OF THE DISCLOSURE

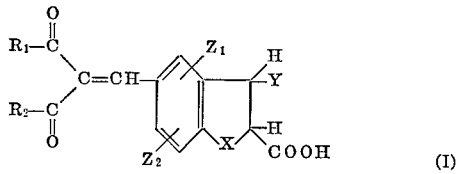
(I)

wherein X is oxygen or sulfur; Y is hydrogen or methyl; Z is chloro, fluoro, methyl or methoxy; $Z_2$ is hydrogen or methyl; and $R_1$ and $R_2$ independently of each other are methyl or ethyl; and the pharmaceutically acceptable salts thereof with a base have diuretic and saluretic effects; these compounds are active ingredients of pharmaceutical compositions and are useful for the treatment of disturbances caused by deficient elimination of electrolytes; a typical embodiment is 2,3 - dihydro-5-(2-acetyl-3-oxo-1-butenyl)-6-chloro-benzo[b]thiophene-2-carboxylic acid.

DETAILED DESCRIPTION

The present invention concerns 2,3-dihydrobenzothiophene and benzofuran-2-carboxylic acid derivatives pharmaceutical compositions comprising these compounds and their use.

More particularly, the present invention concerns compounds of the formula

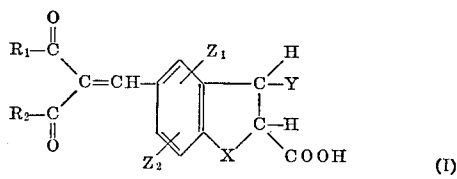
(I)

wherein

X is oxygen or sulphur;
Y is hydrogen or methyl;
$Z_1$ is chloro, fluoro, methyl or methoxy;
$Z_2$ is hydrogen or methyl; and
$R_1$ and $R_2$ independently of each other are methyl or ethyl;

and the pharmaceutically acceptable salts thereof with a base.

The compounds of the present invention, in particular the specific compounds 2,3-dihydro-5-(2-acetyl-3-oxo-1-butenyl)-6,7-dimethyl-benzofuran-2-carboxylic acid and 2,3 - dihydro-5-(2-acetyl-3-oxo-1-butenyl)-6-chloro-benzo [b] thiophene-2-carboxylic acid, possess valuable pharmacological properties in combination with a high therapeutic index. Using standard tests [cf. E. G. Stenger et al., Schweiz. med. Wochenschr. 89, 1126 (1959)], it has been shown that they produce for example in dogs diuretic and saluretic effects upon oral administration of about 5 mg./kg. of bodyweight. These properties indicate that the new compounds are suitable for the treatment of disturbances caused by deficient elimination of electrolytes, in particular of sodium chloride. Such disturbances are the cause of edema and hypertension.

In the compounds of the general Formula I, $Z_1$ and $Z_2$ may occupy the 4-, 6- or 7-position.

Compounds of the general Formula I are produced by a first process according to the present invention by reacting a compound of the general Formula II

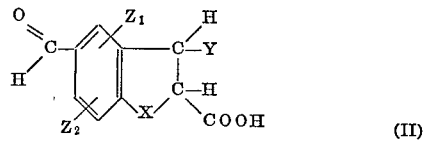
(II)

wherein X, Y, $Z_1$ and $Z_2$ have the meanings given for Formula I, with a diketone of the general Formula III

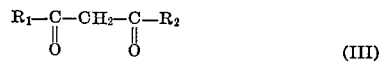
(III)

wherein $R_1$ and $R_2$ have the meanings given for Formula I, and optionally converting a carboxylic acid thus obtained into a salt with an inorganic or organic base.

The reaction is preferably performed in an inert solvent in the presence of an inorganic or organic base. Suitable as inorganic or organic bases are e.g. sodium acetate, or diethylamine, butylamine, piperidine, pyrrolidine and pyridine. Suitable inert solvents are hydrocarbons such as benzene or toluene, ether-type liquids such as dioxane, carboxylic acids such as acetic acid, excess organic bases, or mixtures of such solvents. The reaction is performed at temperatures of from about 20° C. to 150° C., preferably at the boiling point of the solvent or solvent mixture used.

Starting materials of the general Formula II can be produced, for example, by condensing a compound of the general Formula IIb

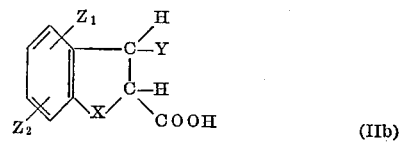
(IIb)

wherein X, Y, $Z_1$ and $Z_2$ have the meanings given for Formula I, with a dichloromethyl alkyl ether in the presence of a Friedel-Crafts catalyst in a solvent. For example, dichloromethyl-methyl ester in nitrobenzene in the presence of aluminum chloride is used in the reaction.

One compound described in the literature, which falls under the general Formula IIb, is 2,3-dihydro-6-methoxy-benzofuran-2-carboxylic acid [cf. W. Will and P. Beck, Chem. Ber. 19, 1783 (1886)]. Other compounds of the type IIb can be produced analogously.

Compounds of the general Formula I are obtained by a second process according to the invention by hydrolyzing a compound of the general Formula IV

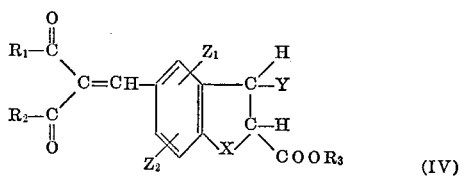
(IV)

wherein $R_3$ represents an alkyl group having at most 4 carbon atoms, and

X, Y, $Z_1$, $Z_2$, $R_1$ and $R_2$ have the meanings given for Formula I, and optionally converting a carboxylic acid thus obtained into a salt with an inorganic or organic base.

As lower alkyl group, $R_3$ is in particular the methyl or ethyl group, furthermore e.g. the propyl, isopropyl, butyl, sec-butyl or tert-butyl group.

The hydrolysis may be performed in acid or alkaline medium at about 20 to 130° C., preferably at the boiling temperature of the solvent. For example, it may be performed in dilute hydrochloride acid or in a mixture of glacial acetic acid and concentrated hydrochloric acid, which is optionally diluted with water. Furthermore, for example, it may be performed in an alkanolic or aqueous-alkanolic solution of alkali-metal or alkaline earth-metal hydroxide or in a corresponding carbonate solution.

From the alkali-metal or alkaline earth-metal salt solutions of acids of general Formula I which are first obtained by hydrolysis in alkaline medium, the corresponding pure alkali-metal or alkaline earth-metal salts may be recovered directly by concentration or evaporation and recrystallisation. Alternatively it is possible to obtain the free carboxylic acids by initial acidification and then to convert these, if desired, into the alkali-metal or alkaline earth-metal salts.

The starting materials of the general Formula IV can be produced, for example, starting from compounds of general Formula II. These compounds are, for example, reacted with lower alkanols, e.g. ethanol, in concentrated sulphuric acid to form the corresponding carboxylic acid esters, e.g. the ethyl esters. These esters can be converted analogously to the first process into the starting materials of the general Formula IV.

For the formation of pharmaceutically acceptable salts can be used inorganic or organic bases such as alkali or alkaline earth hydroxides, carbonates or bicarbonates. Suitable as such are, e.g. sodium, potassium, magnesium and calcium hydroxides, carbonates or bicarbonates, as well as choline and triethanolamine. Such salts are produced e.g. by mixing the compound of Formula I with the equivalent amount of the desired base in a suitable solvent such as water, mixtures of water with an organic solvent or in organic solvents alone, such as methanol, ethanol or propanol, and isolating the salts formed in a conventional manner.

The active compounds of the present invention, including the pharmaceutically acceptable salts thereof, are preferably administered orally in amounts depending on the species of the age, weight and the particular condition of the individual being treated. In general the daily dosages vary between about 1 and 50 mg./kg. of body weight for warm-blooded animals.

Advantageously the compounds are administered in dosage unit forms. Suitable dosage unit forms such as dragées and tablets contain preferably 5 to 100 mg. of an active substance according to the invention, namely 20 to 90% of a compound of the general Formula I. They are produced by combining the active substance with, e.g., solid, pulverulent carriers, such as lactose, saccharose, sorbitol, mannitol; starches such as potato starch, maize starch or amylopectin, also laminaria powder or citrus pulp powder; cellulose derivative or gelatine, optionally with the addition of lubricants such as magnesium or calcium stearate or polyethylene glycols, to form tablets or dragée cores. The latter are coated, e.g. with concentrated sugar solutions which can also contain, e.g. gum arabic, talcum and/or titanium dioxide, or with a lacquer dissolved in readily volatile organic solvents or mixtures of solvents. Dyestuffs can be added to these coatings, e.g. to distinguish between varying dosages of active substance. Other suitable dosage units for oral administration are hard gelatine capsules and also soft, closed capsules made of gelatine and a softener such as glycerin. The former preferably contain the active substance as a granulate in admixture with lubricants such as talcum or magnesium stearate, and optionally stabilizers such as sodium metabisulphite or ascorbic acid. In soft capsules, the active substance is preferably dissolved or suspended in suitable liquids such as liquid polyethylene glycols to which stabilizers may also be added.

The following prescriptions illustrate more in detail the production of tablets, dragées and capsules:

(a) 1000 g. of 2,3-dihydro-5-(2-acetyl-3-oxo-1-butenyl-6,7-dimethyl-benzofuran-2-carboxylic acid are mixed with 550 g. of lactose and 292 g. of potato starch. The mixture is moistened with an aqueous solution of 8 g. of gelatine and granulated through a sieve. After the granulate has been dried, 60 g. of potato starch, 60 g. of talcum, 10 g. of magnesium stearate and 20 g. of colloidal silicon dioxide are mixed in and the mixture is pressed into 10,000 tablets, each weighing 200 mg. and each containing 100 mg. of active substance. Optionally, the tablets can be provided with grooves for more precise adjustment of the dosage amount.

(b) A granulate is prepared from 1000 g. of 2,3-dihydro - 5-(2-acetyl-3-oxo-1-butenyl)-6,7-dimethyl-benzofuran-2-carboxylic acid, 379 g. of lactose and an aqueous solution of 6 g. of gelatine. After drying, the granulate is mixed with 10 g. of colloidal silicon dioxide, 40 g. of talcum, 60 g. of potato starch and 5 g. of magnesium stearate. From the mixture there are pressed 10,000 dragée cores which are subsequently coated with a concentrated syrup consisting of 533.5 g. of crystalline saccharose, 20 g. of shellac, 75 g. of gum arabic, 250 g. of talcum, 20 g. of colloidal silicon dioxide and 1.5 g. of dyestuff and dried. The dragées obtained each weigh 240 mg. and each contain 100 mg. of active substance.

(c) To produce 1000 capsules each containing 100 mg. of active substance, 100 g. of 2,3-dihydro-5-(2-acetyl-3-oxo-1-butenyl)-6,7-dimethyl-benzofuran-2-carboxylic acid are mixed with 9.5 g. of talcum and 0.5 g. of magnesium stearate. The mixture is pressed through a sieve (e.g. sieve IV, Ph. Helv. V.) and then evenly filled into capsules, size O.

The same amount of one of the following compounds may also be used as active substance for the tablets, capsules and dragées:

2,3-dihydro-5-(2-acetyl-3-oxo-1-butenyl)-6-chlorobenzo[b]thiophene-2-carboxylic acid,
2,3-dihydro-5-(2-acetyl-3-oxo-1-butenyl)-6-methylbenzofuran-2-carboxylic acid.

The following examples illustrate more in detail the production of the new compounds of the general Formula I and of intermediates which have not been previously described; they are, however, not to be considered to limit the invention in any way. The temperatures are given in degrees centigrade.

Example 1

(a) A mixture of 2.0 g. of 2,3-dihydro-5-formyl-6,7-dimethyl-benzofuran-2-carboxylic acid, 35 ml. of toluene, 13 ml. of glacial acetic acid, 2.0 g. of acetyl acetone and 0.5 ml. of piperidine are refluxed for 2½ hours while the water being formed during the reaction is removed by azeotropic distillation. The reaction mixture is then cooled, 100 ml. of ether are added, the ethereal solution is washed with 50 ml. of 1 N hydyrochloric acid and twice with 50 ml. each of water, dried over magnesium sulphate and concentrated by evaporation under vacuum. The residue is recrystallized from benzene; the pure 2,3-dihydro-5-(2-acetyl - 3 - oxo-1-butenyl)-6,7-dimethylbenzofuran-2-carboxylic acid melts at 132–134°; yield 0.9 g., 30% of theory.

The 2,3 - dihydro-5-formyl-6,7-dimethyl-benzofuran-2-carboxylic acid required as starting material is produced as follows:

(b) 45.0 g. of 2,3-dimethyl-phenol and 50.0 g. of malic acid are pulverized and mixed well; 100 ml. of concentrated sulphuric acid are added to the mixture and slowly heated with stirring so that the reaction temperature reaches 130° after 30 minutes. The solution is kept for 30 minutes longer at this temperature, then poured onto 1 kg. of ice and the resultant suspension is stirred for 30 minutes. The precipitated crystals are removed by suction filtration and recrystallized from ethanol. 7,8-dimethyl-coumarin having a melting point of 128–130° is obtained.

(c) 34.8 g. of the 7,8-dimethyl-coumarin obtained are dissolved in 60 ml. of chloroform. A solution of 32.5 g. of bromine in 20 ml. of chloroform is added to this solution with stirring and intermittent cooling with ice so that the reaction temperature is from 20 to 25°. The mixture is stirred for 20 minute more at room temperature, and then the chloroform is completely evaporated under vacuum. The residue is added in portions to a slurry of 90.0 g. of potassium hydroxide in 300 ml. of ethanol and the reaction temperature is kept between 30° and 40° by cooling with ice. The mixture is then stirred for 30 minutes at 40° and 30 minutes at 80° and then poured onto 2 liters of ice water. The aqueous alkaline solution is washed twice with 400 ml. of ether each, the pH is adjusted to 2–3 with concentrated hydrochloric acid, and the suspension obtained is stirred for half an hour at room temperature. The precipitated crystals are removed by suction filtration and recrystallized from ethanol. 6,7-dimethyl-benzofuran-2-carboxylic acid, M.P. 237–239°, is obtained.

(d) 37.8 g. of the carboxylic acid obtained according to (c) are dissolved in 500 ml. of a saturated, aqueous sodium bicarbonate solution and the solution is cooled to 5° in an ice bath. 500.00 g. of 5% sodium amalgam are added; after 2 hours the reaction mixture is removed from the ice bath and allowed to stand for 24 hours at 20°. Then the solution is separated from the mercury and filtered; the pH of the filtrate is adjusted with concentrated hydrochloric acid to 1. The precipitate which separates is removed by filtration, washed with 300 ml. of water and dried. After recrystallization from ethanol, the 2,3-dihydro-6,7-dimethyl-benzofuran-2-carboxylic acid melts at 182°.

(e) 5.0 g. of the carboxylic acid obtained according to (d) are cooled in 13 ml. of nitrobenzene to 0°. 10.5 g. of aluminum chloride are added in portions to the cooled solution at 0° to 10° while excluding atmospheric moisture. Then 4.5 g. of dichloromethyl-methyl ether are added dropwise at 0° to 3° during 20 minutes. The mixture is then heated to 20°, stirred for 30 minutes more and then carefully poured onto 500 g. of ice. The aqueous suspension obtained is extracted twice with 250 ml. each of ethyl acetate. The ethyl acetate solution is then shaken out twice with 100 ml. each of concentrated aqueous sodium hydrogen carbonate solution. The sodium hydrogen carbonate solution is adjusted with 4 N hydrochloric acid to a pH of 2, the crude carboxylic acid precipitate is removed by suction filtration, dried at 60° under vacuum and recrystallised from benzene/ethanol. 2.5 g. of 2,3-dihyro-5-formyl - 6,7-dimethylbenzofuran-2-carboxylic acid, M.P. 194–196°, are obtained, yield 45% of theory.

Example 2

(a) Analogously to Example 1(a), from 1.6 g. of 2,3-dihydro - 4-methyl-5-formlyl-benzofuran-2-carboxylic acid with 1.6 g. of acetyl acetone and 0.3 ml. of piperidine in 27 ml. of toluene and 11 ml. of glacial acetic acid there is obtained 2,3 - dihydro - 4-methyl-5-(2-acetyl-3-oxo-1-butenyl) - benzofuran - 2-carboxylic acid, M.P. 139–141° (from benzene); yield 1.0 g., 48% of theory.

2,3 - dihydro - 4-methyl-5-formyl-benzofuran-2-carboxylic acid, required as starting material, is produced as follows:

(b) A suspension of 11 g. of 2-methyl-6-hydroxybenzaldehyde [cf. O. Anselmino, Chem. Ber. 50, 395 (1917)] and 11 g. of anhydrous potassium carbonate in 40 ml. of methyl ethyl ketone is stirred and refluxed, and within 15 minutes 20 g. of bromomalonic acid diethyl ester are added dropwise thereto. Then the reaction mixture is refluxed and stirred for 7 more hours and then concentrated by evaporation under vacuum. A solution of 10 g. of potassium hydroxide in 8 ml. of water and 80 ml. of ethanol is added to the residue; the mixture is refluxed for 2 hours, cooled, 100 ml. of water are added and the ethanol is evaporated in vacuum. The residual alkaline aqueous solution is acidified with 20% sulphuric acid to a pH of 2–3. The crude crystalline product which precipitates is removed by filtration, washed with water, dried under vacuum at 60° and recrystallised from benzene; the pure 4-methyl-benzofuran-2-carboxylic acid melts at 189–191°.

(c) Analogously to Example 1(d), from 37.8 g. of 4-methyl-benzofuran-2-carboxylic acid and 500.0 g. of 5% sodium amalgam, there is obtained 2,3-dihydro-4-methyl-benzofuran-2-carboxylic acid, M.P. 157–159°.

(d) From 3.5 g. of the carboxylic acid obtained according to (c), there are obtained, analogously to Example 1(e) with 3.5 g. of dichloromethyl methyl ether, and 8 g. of aluminum chloride in 15 ml. of nitrobenzene, 2,3-dihydro-4-methyl-5-formyl-benzofuran 2-carboxylic acid, M.P. 196–198° (from benzene/ethanol); yield 1.6 g., 40% of theory.

Example 3

(a) Analogously to Example 1(a), from 6.0 g. of 2,3-dihydro - 5-formyl-6-methyl-benzofuran-2-carboxylic acid, 5.0 g. of acetyl acetone and 1 g. of piperidine in 125 ml. of toluene and 30 ml. of glacial acetic acid, there is obtained 2,3-dihydro-5-(2-acetyl-3-oxo-1-butenyl)-6-methyl-benzofuran-2-carboxylic acid, M.P. 175–176°; yield 4.3 g., 53% of theory.

The 2,3 - dihydro-5-formyl-6-methyl-benzofuran-2-carboxylic acid required as starting material is produced as follows:

(b) 35.0 g. of 6-methyl-benzofuran-2-carboxylic acid [cf. K. von Auwers, Ann. Chem. 408, 255 (1915)] are dissolved in 500 ml. of a saturated, aqueous sodium hydrogen carbonate solution, and the solution is cooled in an ice bath to 5°. 500.0 g. of 5% sodium amalgam are added, the reaction mixture is removed from the ice bath after 2 hours and allowed to stand for 24 hours at 20°. The solution is then separated from the mercury and filtered; the filtrate is adjusted with concentrated hydrochloric acid to a pH of 1. The precipitate which separates is removed by filtration, washed with 300 ml. of water and dried. The 2,3 - dihydro-6-methylbenzofuran-2-carboxylic acid obtained melts at 157° and after recrystallization from methanol/water at 158°.

(c) Analogously to Example 1(e), from 18.0 g. of the carboxylic acid produced according to (b), 16 g. of dichloromethyl methyl ether and 40 g. of aluminum chloride in 50 ml. of nitrobenzene, there is obtained 2,3-dihydro - 5-formyl-6-methyl-benzofuran-2-carboxylic acid, M.P. 165–167° (from ethanol); yield 12 g., 57% of theory.

Example 4

(a) Analogously to Example 1(a), from 3.7 g. of 2,3-dihydro - 5 - formyl - 6-methoxy-benzofuran-2-carboxylic acid, 3.5 g. of acetyl acetone and 0.7 g. of piperidine in 70 ml. of toluene and 27 ml. of glacial acetic acid, there is obtained 2,3 - dihydro-5-(2-acetyl-3-oxo-1-butenyl)-6-methoxy-benzofuran - 2-carboxylic acid, M.P. 102–105° (from benzene); yield 1.6 g., 32% of theory.

The 2,3 - dihydro - 5-formyl-6-methoxy-benzofuran-2-carboxylic acid required as starting material is produced as follows:

(b) Analogously to Example 1(e), from 70 g. of 2,3-dihydro - 6-methoxy-benzofuran-2-carboxylic acid [cf. W. Will and P. Beck, Chem. Ber. 19, 1783 (1886)], 74 g. of dichloromethyl methyl ether and 140 g. of aluminum chloride in 200 ml. of nitrobenzene, there is obtained 2,3-dihydro - 5 - formyl-6-methoxy-benzofuran-2-carboxylic acid, M.P. 212–214° (from ethyl acetate/dioxane); yield 38 g., 48% of theory.

Example 5

Analogously to Example 1(a), from 6.5 g. of 2,3-dihydro - 5 - formyl-6,7-dimethyl-benzofuran-2-carboxylic acid, 6.5 g. of 2,4-hexanedione and 1.5 ml. of piperidine in 130 ml. of toluene and 40 ml. of glacial acetic acid, there is obtained 2,3-dihydro-5-(2-acetyl-3-oxo-1-pentenyl) - 6,7 - dimethyl-benzofuran-2-carboxylic acid, M.P. 125–129° (from benzene); yield 4.7 g., 50% of theory.

Example 6

(a) Analogously to Example 1(a), from 4.0 g. of 2,3-dihydro - 5 - formyl - 6-chloro-benzo[b]thiophene-2-carboxylic acid, 3.5 g. of acetic acetone, and 0.7 ml. of piperidine in 70 ml. of toluene and 27 ml. of glacial acetic acid, there is obtained 2,3 - dihydro-5-(2-acetyl-3-oxo-1-butenyl) - 6 - chloro-benzo[b]thiophene - 2-carboxylic acid, M.P. 155–157° (from benzene/ether acetate); yield 2.7 g., 50% of theory.

The starting material, 2,3 - dihydro-5-formyl-6-chloro-benzo[b]thiophene-2-carboxylic acid, is produced as follows:

(b) A mixture of 96 g. of rhodanine, 169 g. of anhydrous sodium acetate and 450 ml. of glacial acetic acid is heated to 10°. 126 g. of 2,4-dichlorobenzaldehyde, dissolved in 225 ml. of glacial acetic acid, are introduced into the resultant solution. A slurry is formed which is refluxed for 30 minutes. The hot mixture is then poured into 6 liters of ice water. The precipitated 5-(2,4-dichloro-benzylidene)-rhodanine is separated by suction filtration and washed with water.

The resultant crude product is dissolved in 2 liters of 5% aqueous sodium hydroxide by heating it. From the cooled solution, traces of 2,4-dichlorbenzaldehyde precipitate, which are removed by filtration. Excess concentrated hydrochloric acid is rapidly added to the filtrate which is again cooled. The precipitated 2,4-dichloro-α-mercapto-cinnamic acid is filtered. The acid is taken up in ether; the ethereal soluiton is dried over sodium sulphate and concentrated by evaporation. The residue is heated with 1350 ml. of diethylene glycol and 117 g. of sodium ethylate to 150–160° (inner temperature) and stirred for one hour at this temperature, whereby methanol distills off. Then the mixture is poured onto 5 kg. of ice and made acid to Congo red paper with hydrochloric acid. 6-chloro-benzo[b]thiophene-2-carboxylic acid precipitates, which is removed by filtration and recrystallized from dioxane/ethyl acetate, M.P. 283°.

(c) 40.4 g. of the carboxylic acid obtained according to (b) are reduced analogously to Example 1 (d) with 500 g. of aqueous 5% sodium amalgam to obtain 2,3-dihydro-6-chloro-benzo[b]thiophene - 2 - carboxylic acid, M.P. 196–198°

(d) Analogously to Example 1(e), from 16.8 g. of 2,3-dihydro-6-chloro-benzo[b]thiophene-2-carboxylic acid with 14 g. of dichloromethyl methyl ether in the presence of 31.6 g. of aluminum chloride in 42 ml. of nitrobenzene, there is obtained 2,3-dihydro-5-formyl-6-chloro-benzo[b]thiophene-2-carboxylic acid, M.P. 167–170° (from ethyl acetate); yield 7.9 g., 42% of theory.

Example 7

(a) Analogously to Example 1(a), from 1.9 g. of 2,3-dihydro - 4 - chloro - 5-formyl-benzo[b]thiophene-2-carboxylic acid with 2 ml. of acetyl acetone and 0.5 ml. of piperidine in 40 ml. of toluene and 15 ml. of glacial acetic acid, there is obtained 2,3-dihydro-4-chloro-5-(2-acetyl-3-oxo - 1 - butenyl)-benzo[b]thiophene-2-carboxylic acid, M.P. 184–186° (from ethyl acetate/dioxane): yield 1.1 g., 44% of theory.

The starting material, 2,3-dihydro-4-chloro-5-formyl-benzo[b]thiophene-2-carboxylic acid, is produced as follows:

(b) Analogously to Example 6(b), from 126 g. of 2,6-dichlorobenzaldehyde and 96 g. of rhodanine, there is obtained the crude 5-(2,6-dichloro-benzylidene)-rhodanine which, by boiling for 10 hours with sodium hydroxide solution, is hydrolyzed directly to 4-chloro-benzo[b]thiophene-2-carboxylic acid, M.P. 257–259° (from ethanol).

(c) 40.4 g. of the carboxylic acid obtained according to (b) are reduced analogously to Example 1(d) with 500 g. of aqueous 5% sodium amalgam to obtain 2,3-dihydro-4-chlorobenzo[b]thiophene - 2 - carboxylic acid, M.P. 158–160° (from benzene).

(d) Analogously to Example 1(e), from 16.8 g. of 2,3-dihydro - 4 - chloro-benzo[b]thiophene-2-carboxylic acid with 14 g. of dichloromethyl methyl ether in the presence of 31.6 g. of aluminum chloride in 42 ml. of nitrobenzene, there is obtained 2,3-dihydro-4-chloro-5-formyl-benzo[b]thiophene-2-carboxylic acid, M.P. 186–188° (from ethyl acetate); yield 7.9 g., 42% of theory.

Example 8

(a) Analogously to Example 1(a) and starting from 5.0 g. 2,3 - dihydro-3,6-dimethyl-5-formyl-benzofuran-2-carboxylic acid, 8 ml. acetylacetone and 2 ml. piperidine in 80 ml. toluene and 30 ml. acetic acid is obtained 2,3-dihydro - 3,6-dimethyl-5-(2-acetyl-3-oxo-1-butenyl)-benzofuran-2-carboxylic acid, M.P. 156–158° (from acetic acid); yield 5.5 g. (80% of theory).

The 2,3 - dihydro-3,6-dimethyl-5-formyl-benzofuran-2-carboxylic acid used as starting material is obtained as follows:

(b) 15.2 g. 2,3-dihydro-3,6-dimethyl-benzofuran-2-carboxylic acid [K. Fries, G. Fickewirth, Ann. Chem. 362, 49 (1908)] were stirred into 40 ml. nitrobenzene. To this mixture 32 g. of powdered anhydrous aluminum chloride are added portionwise so that the temperature does not rise above 10°. Thereafter the reaction mixture is cooled to 0° and 14 g. dichloromethyl-methyl ether are added dropwise over a period of 30 minutes. The suspension is thereafter stirred for 30 minutes at room temperature, poured onto 250 g. ice and the mixture treated with 250 ml. ether. The ether phase is separated, washed with 50 ml. water and extracted twice with 50 ml. portions sodium bicarbonate solution. The sodium bicarbonate extract is adjusted to pH 1 to 2 with hydrochloric acid and the developed precipitate filtered under suction. The precipitate is dried and crystallised from acetic acid. 6 g. (35% of the theoretical) of 2,3-dihydro-3,6-dimethyl-5-formyl-benzofuran-2-carboxylic acid are obtained, M.P. 199–200°.

Example 9

(a) 0.8 g. of 2,3 dihydro-5-(2-acetyl-3-oxo-1-butenyl)-6,7-dimethyl-benzofuran-2-carboxylic acid ethyl ester is refluxed in a mixture of 5 ml. of glacial acetic acid, 5 ml. of water and 1 ml. of concentrated hydrochloric acid for 30 minutes with stirring. The mixture is then diluted with 50 ml. of water, cooled and stirred for 30 minutes longer to complete the crystallization.

The crude product is suction filtered, dried and recrystallized from benzene. 0.4 g. of 2,3-dihydro-5-(2-acetyl-3-oxo - 1 - butenyl) - 6,7-dimethyl-benzofuran-2-carboxylic acid, M.P. 133–134°, is obtained; yield 55% of theory.

The starting material, 2,3-dihydro-5-(2-acetyl-3-oxo-1-butenyl)-6,7-dimethyl-benzofuran-2-carboxylic acid ethyl ester, is produced as follows:

(b) 30 g. of 2,3-dihydro-5-formyl-6,7-dimethyl-benzofuran-2-carboxylic acid are refluxed in 400 ml. of absolute ethanol with 30 ml. of concentrated sulphuric acid for 3 hours. Then 300 ml. of ethanol are distilled off under vacuum and the residue is distributed in 300 ml. of water and 300 ml. of ether. The ether phase is washed with 200 ml. of water, then twice with 100 ml. each of saturated sodium bicarbonate solution, dried over sodium sulphate and concentrated by evaporation. The residue is distilled under high vacuum. The 2,3-dihydro-5-formyl-6,7-dimethyl-benzofuran-2-carboxylic acid ethyl ester boils at 132–135°/0.02 torr; yield 26 g., 77% of theory.

(c) 2.0 g. of the ester obtained according to (b) are boiled in 20 ml. of benzene with 0.53 g. of butylamine for 2 hours while removing the water which forms by azeotropic distillation. The benzene is then evaporated, the residue is dissolved in 10 ml. of glacial acetic acid, 4 g. of acetyl acetone are added, and the mixture is refluxed for 75 minutes. The solution is then poured onto 50 ml. of water, and the reaction mixture is extracted with 50 ml. of ether. The ethereal solution is washed wtih 50 ml. of water and twice with 50 ml. each of saturated sodium hydrogen carbonate solution, dried over sodium sulphate and concentrated by evaporation. The residue is purified by chromatography on a column of silica gel. 0.8 g. of 2,3-dihydro-5-(2-acetyl-3-oxo-1-butenyl)-6,7-dimethyl-benzofuran-2-carboxylic acid ethyl ester is obtained as colorless oil, which is used as crude product.

Example 10

(a) 0.9 g. of 2,3-dihydro-5-(2-acetyl-3-oxo-1-butenyl)-6-chloro-benzo[b]thiophen-2-carboxylic acid ethyl ester is refluxed in a mixture of 5 ml. of glacial acetic acid, 5 ml. of water and 1 ml. of concentrated hydrochloric acid for 30 minutes with stirring. The mixture is then diluted with 50 ml. of water, cooled and stirred for 40 minutes longer to complete the crystallisation.

The crude product is suction filtered, dried and recrystallised from benzene. 0.4 g. of 2,3-dihydro-5-(2-acetyl-3-oxo-1-butenyl) - 6 - chloro-benzo[b]thiophen-2-carboxylic acid, M.P. 155–157°, is obtained; yield 50% of theory.

The starting material, 2,3-dihydro-5-(2-acetyl-3-oxo-1-butenyl) - 6 - chloro-benzo[b]thiophen-2-carboxylic acid ethyl ester, is produced as follows:

(b) 3 g. of 2,3-dihydro-5-formyl-6-chloro-benzo[b]thiophen-2-carboxylic acid are refluxed in 40 ml. of absolute ethanol with 3 ml. of concentrated sulphuric acid for 3 hours. Then 30 ml. of ethanol are distilled off under vacuum, and the residue is distributed in 30 ml. of water and 30 ml. of ether. The ether phase is washed with 20 ml. of water, then twice with 10 ml. each of saturated sodium bicarbonate solution, dried over sodium sulphate and concentrated by evaporation. The residue is distilled under high vacuum. The 2,3-dihydro-5-formyl-6-chloro-benzo[b]thiophen-2-carboxylic acid ethyl ester boils at 137–145°/0.02 torr; yield 2.4 g., 70% of theory.

(c) 2.2 g. of the ester obtained according to (b) are boiled in 20 ml. of benzene with 0.53 g. of butylamine for 2 hours while removing the water which forms by azeotropic distillation. The benzene is then evaporated, the residue is dissolved in 10 ml. of glacial acetic acid, 4 g. of acetyl acetone are added, and the mixture is refluxed for 75 minutes. The solution is then poured onto 50 ml. of water, and the reaction mixture is extracted with 50 ml. of ether. The ethereal solution is washed with 50 ml. of water and twice with 50 ml. each of saturated sodium hydrogen carbonate solution, dried over sodium sulphate and concentrated by evaporation. The residue is purified by chromatography on a column of silica gel. 0.8 g. of 2,3-dihydro-5-(2-acetyl-3-oxo-1-butenyl) - 6 - chloro-benzo[b]thiophen-2-carboxylic acid ethyl ester is obtained as colorless oil, which is used as crude product.

What is claimed is:
1. A compound of the formula

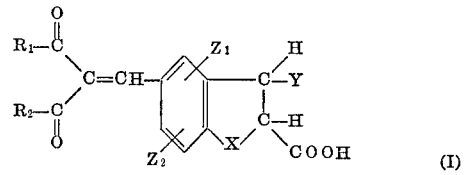

wherein
$X$ is oxygen or sulphur;
$Y$ is hydrogen or methyl;
$Z_1$ is chloro, fluoro methyl or methoxy;
$Z_2$ is hydrogen or methyl; and
$R_1$ and $R_2$ independently of each other are methyl or ethyl;

or a pharmaceutically acceptable salt thereof with a base.

2. A compound according to claim 1 which is 2,3-dihydro - 5 - (2-acetyl-3-oxo-1-butenyl)-6-chloro-benzo[b]thiophene-2-carboxylic acid.

3. A compound according to claim 1 which is 2,3-dihydro - 5 - (2-acetyl-3-oxo-1-butenyl)-6,7-dimethyl-benzofuran-2-carboxylic acid.

References Cited
UNITED STATES PATENTS
3,413,308   11/1968   Bockstahler _____ 260—330.5

HENRY R. JILES, Primary Examiner
C. M. SHURKO, Assistant Examiner

U.S. Cl. X.R.
260—346.2; 424—275, 285